United States Patent [19]

Pagot

[11] Patent Number: 4,672,882

[45] Date of Patent: Jun. 16, 1987

[54] ABUTMENT KEY FOR THE VALVE PLUNGER OF A BRAKING ASSISTANCE SERVOMOTOR, AND A SERVOMOTOR EQUIPPED WITH SUCH A KEY

[75] Inventor: Henry Pagot, Villetaneuse, France

[73] Assignee: Bendix France, Paris, France

[21] Appl. No.: 844,434

[22] Filed: Mar. 26, 1986

[30] Foreign Application Priority Data

Mar. 27, 1985 [FR] France ............... 85 04555

[51] Int. Cl.⁴ ............................................. F15B 9/10
[52] U.S. Cl. ................................................. 91/369 A
[58] Field of Search ............ 91/369 A, 369 B, 369 C, 91/376 R; 60/547.1; 403/155, 319, 355

[56] References Cited

U.S. PATENT DOCUMENTS

| | | | |
|---|---|---|---|
| 3,312,147 | 4/1967 | Reichard | 91/369 C |
| 3,688,647 | 9/1972 | Kytta | 91/369 C |
| 4,491,058 | 1/1985 | Morin | 91/369 C X |
| 4,512,237 | 4/1985 | Endoh et al. | 91/376 R X |
| 4,619,185 | 10/1986 | Mori et al. | 91/376 R X |

FOREIGN PATENT DOCUMENTS 2551710  3/1985  France .

Primary Examiner—Robert E. Garrett
Assistant Examiner—Mark A. Williamson
Attorney, Agent, or Firm—Larry J. Palguta; Ken C. Decker

[57] ABSTRACT

The planar abutment key (11) incorporates in its body portion (18) two flexible fingers (22) extending laterally and angularly in the direction away from the end portion (19) of the key which forms abutment arms (21) for the plunger, each finger (22) ending in a sharp angle (24), the transverse distance at rest between the sharp angles (24) being greater than the transverse width ($d_1$) of the slot (12) in the hub portion of the assistance piston (1) in which the key (11) is housed.

7 Claims, 3 Drawing Figures

ABUTMENT KEY FOR THE VALVE PLUNGER OF A BRAKING ASSISTANCE SERVOMOTOR, AND A SERVOMOTOR EQUIPPED WITH SUCH A KEY

The present invention concerns abutment keys for the distribution valve plunger of a servomotor for assisting with braking, typically of the vacuum type, the key being intended to be housed in a radial slot in a hub portion of an assistance piston of the servomotor, the key being of the type which is formed from a metal plate and comprises a body portion which is extended by an end portion having a transverse width which is less than the transverse width of the slot and is formed with a notch forming two end arms, and retaining means on the body portion for co-operation with at least one adjacent wall of the radial slot.

An abutment key of this type is particularly described in the document EP-A-0,101,658, whose content is assumed to be incorporated here for reference.

A constant concern with this type of abutment key is to avoid the key becoming undesirably disengaged from the slot in the hub, particularly under the effect of the considerable vibration to which this type of motor vehicle equipment is subjected. In the document EP-A-0,101,658, the key has lateral edges which are folded back and which are lightly engaged by force in the radial slot, and the slot is also provided, on its front surface, with a retaining projection which is intended to received within a central opening of the body portion of the key. The document DE-A-3,113,271 also describes a key passing through openings of small width in the peripheral wall of the hub portion and in a concentric sleeve which is firmly fixed to the assistance piston, the key comprising in its external portion lateral recesses which are intended to co-operate with facing projections in the opening in the hub portion. These various arrangements require a special shape of the hub poriton (which is generally achieved by molding as a single piece) thereby increasing the cost of manufacture. In addition, taking into account the relatively soft material forming the hub portion, the retaining projections frequently become damaged when the key is put into position, and then subsequently, when the servomotor is put into operation, frequently pulling on the abutment key.

One object of the present invention is to propose an abutment key of simple and robust design, not requiring any special shape of the hub portion and providing a retaining effect by self-locking of the key in the slot in the hub portion.

To achieve this, according to feature of the invention, the body portion of the abutment key comprises two elastic fingers which extend laterally and angularly in the direction away from the end portion forming the end arms, and which both end in a sharp angle, the transverse distance at rest between the apexes of the sharp angles being greater than the transverse width of the slot in the hub portion.

With such arrangement, when the key is inserted in the slot, the flexible fingers are drawn in by contracting transversely so as to slide along the walls of the slot which face each other transversely, until the key occupies its final mounting position. In this position, the sharp angles of the flexible fingers bear incisively against the facing lateral walls of the slot into which they penetrate slightly. If the key has a tendency to come out of the slot, a strut effect of the flexible fingers occurs tending to make them separate and bite more deeply into the wall of the slot, thus ensuring that the key is held in the latter.

Another object of the present invention is thus to propose a servomotor for assisting with braking which is designed to be equipped with such a key, whose design is simplified and whose manufacturing cost is reduced.

To achieve this, according to another feature of the invention, in such a servomotor, of the type comprising an assistance piston hub, in which a valve plunger slides, and an abutment key for this plunger which is engaged in a radial slot in the piston hub against a first axial flat wall of this slot, this slot has, in line with the abutment key, a substantially constant transverse width over its full radial length.

As the self-locking effect of the key in the slot has a tendency to pull this key radially inwards, in the direction towards the plunger, according to another feature of the invention, the slot in the hub portion is formed with an internal radial abutment surface for at least one of the end arms of the key.

Other features and advantages of the present invention will emerge from the following description of embodiments, which are given by way of illustration but are not limiting in any way, with reference to the accompanying drawings, in which.

In the description which follows and in the drawings, identical or similar components carry the same reference numbers.

Figure 1:
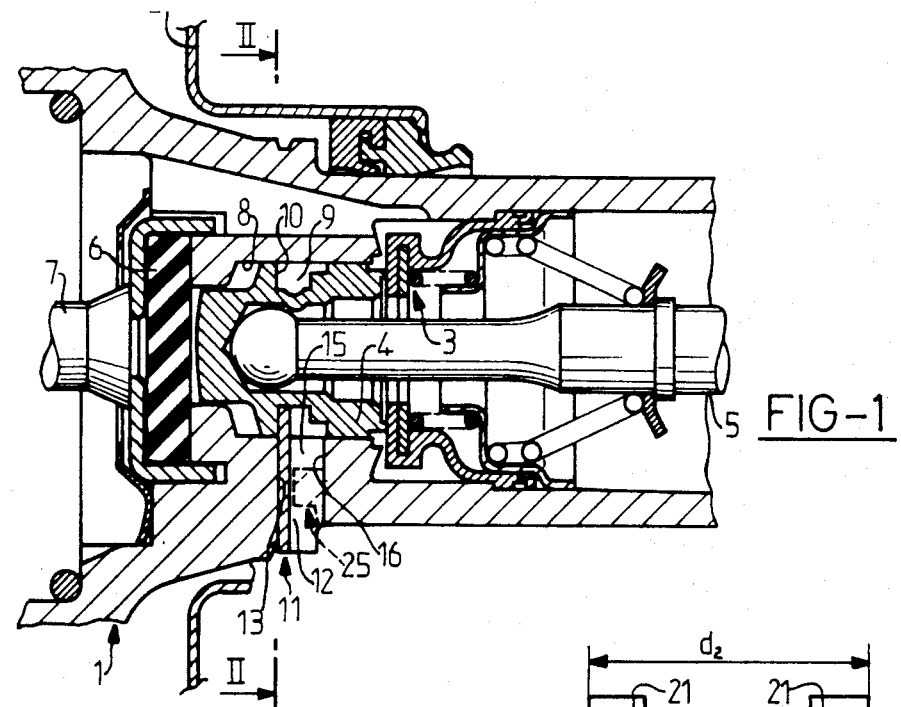
FIG. 1 is a partial view in longitudinal section of an assistance servomotor hub equipped with an abutment key according to the invention.

FIG. 1 shows the central portion of a hub 1, typically made of a plastic such as Bakelite, of an assistance piston servomotor of which a portion of the rear shell of the casing 2 is shown. A three-way distribution valve means 3 is situated in the hub portion 1; the distribution valve means 3 is associated with a valve plunger 4 which is firmly fixed to the input rod 5 of the servomotor and is capable of co-operating with a reaction disc 6 which is mounted in an end cup of an output rod 7 of the servomotor, which is intended typically to be coupled to the piston of a master cylinder (not shown) associated with the assistance servomotor. In a conventional manner, the plunger 4 slides axially in a central bore 8 of the hub 1 and incorporates a peripheral annular groove 9 defining an annular bearing surface 10 which is directed towards the input rod 5 and is intended to co-operate in bearing engagement with an abutment key, given the general reference 11, mounted in a radial slot 12 in the hub 1. More specifically, as shown more clearly in FIG. 2, the slot 12 is bounded axially, on the same side as the output rod 7, by a front axial flat wall 13 and is defined, in the vicinity of this front wall 13 and at least in the vicinity of the bore 8, by two radial parallel grooves facing each other 14, the slot 12 further comprising a central portion 15 whose axial length is greater than the axial length of the grooves 14, and bounded by a second axial wall 16 so as to form an access passage for fluid to the valve means 3. The transverse width $d_1$ of the slot 12, at least in the vicinity of the front wall 13, is substantially constant over its full radial length, typically greater than the diameter of the bore 8, thus forming, substantially in the region of a diametral plane of this bore 8, internal radial abutment surfaces 17 for the abutment key 11, as it will be described below.

The abutment key 11 has an entirely planar configuration and is made by stamping from a metal plate of about 1.5 mm thickness, for example of hardened steel. The key 11 comprises a body portion 18 terminated by an end portion 19 which is centrally shaped with a semi-circular cut-out 20 whose diameter is greater than the internal diameter of the groove 9, so as to form two end arms 21 for co-operation with the annular bearing surface 10 of the plunger 4. The transverse width $d_2$ of the end portion 19 is less than the transverse width $d_1$ of the slot 12.

Figure 2:
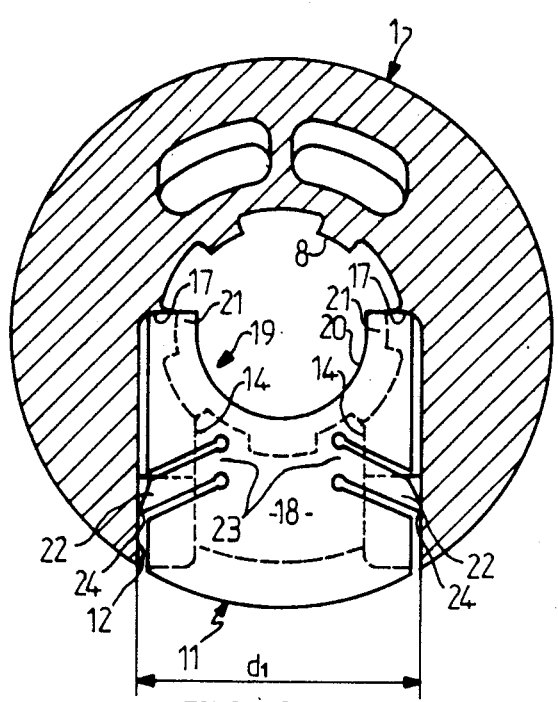
FIG. 2 is a diagrammatic view in transverse section through the section plane II—II shown in FIG. 1 showing a first embodiment of a key according to the invention.

According to a feature of the invention, the body portion 18 of the key 11 is shaped, by stamping the material of which the key is formed, with two flexible fingers 22 which extends symmetrically, laterally and angularly in the direction away from the end portion 19, from connecting points 23 joining them to a central area of the body portion 18, which have a reduced cross-section to provide the fingers 22 with the necessary flexibility in the plane of the key. The fingers 22 each terminate, away from the end portion 19, in a sharp angle 24, the transverse distance $d_3$ between the apexes of theses sharp angles at rest being greater by 1 to 2 mm, for example, than the transverse width $d_1$ of the radial slot 12. As shown in FIG. 2, the key 11 is engaged in the slot 12, substantially without axial play between the end portion 19 and the grooves 14 until the ends of the arms 21 come to bear against the radial abutment surfaces 17, the flexible fingers 24 meanwhile sliding in a contracted condition against the facing walls of the slot 12. In the final mounting position shown in FIG. 2, the sharp angles 24 of the fingers 22 bear incisively against the transverse walls of the slot 12 so as to provide the "harpoon" retaining effect mentioned above.

Figure 3:
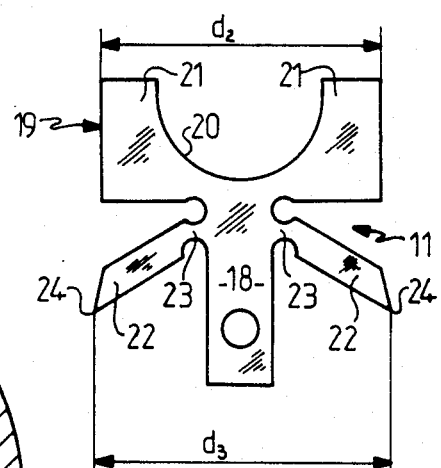
FIG. 3 is a plan view of a second embodiment of a key according to the invention.

In the embodiment shown in FIG. 2, the body portion 18 (with the exception of the fingers 22) has a solid configuration with a transverse width essentially equal to the width $d_2$ of the end portion 19. A projecting portion 25 may however be provided in the central portion of greater axial length 15 of the slot 12, the projecting portion 25 extending axially from the second axial frontal wall 16 towards the first axial frontal wall 13 to the immediate region of the key 11. In these conditions, the body portion 18 of the key 11 may have a reduced width as shown in FIG. 3.

Although the present invention is described above in relation to particular embodiments, it is not limited by them but on the contrary is capable of modifications and variants which will be apparent to a person skilled in the art.

I claim:
1. Abutment key for the plunger (4) of the distribution valve (3) of a braking assistance servomotor, the key being intended to be housed in a radial slot (12) in an assistance piston hub portion (1) of the servomotor, the key (11) being formed from a metal plate and comprising a body portion (18), an end portion (19) having a transverse width ($d_2$) which is less than a transverse width ($d_1$) of the radial slot (12) and is shaped with a cut-out (20) forming two end arms (21), and retaining means on the body portion (18) for co-operation with at least one adjacent wall of the radial slot, characterized in that the body portion (18) of the key (11) has two flexible fingers (22) which extend laterally and angularly in a direction away from said end portion (19) and both terminate in a sharp angle (24), a transverse distance ($d_3$), at rest, between the angles (24) being greater than the transverse width ($d_1$) of the radial slot (12).

2. Abutment key according to claim 1, characterized in that the flexible fingers (22) are each bounded by two slots in the body portion (18) and are each joined to a central zone of the body portion by a connecting zone of reduced width (23).

3. Abutment key according to claim 2, characterized in that the key (11) is completely flat.

4. Abutment key according to claim 2, further comprising a braking assistance servomotor having in the hub portion (1) of an assistance piston the plunger (4) of the distribution valve (3) and the abutment key (11) engaged in a radial slot (12) of the piston hub portion (1) against a first axial flat wall (13) of the radial slot, the radial slot (12) having, in line with the key (11), a transverse width ($d_1$) which is essentially constant over its full radial length.

5. The abutment key and servomotor according to claim 4, characterized in that the slot (12) comprises an internal radial abutment surface (17) for at least one of the end arms (21) of the key (11).

6. The abutment key and servomotor according to claim 5, characterized in that the slot (12) comprises, at least in a region of the plunger (4), two facing radial parallel grooves (14) which are bounded axially on one side by the axial flat wall (13) of the slot and which accept substantially without axial play the end portion (19) of the key.

7. The abutment key and servomotor according to claim 6, characterized in that the slot (12) comprises a central portion (15) having an axial length greater than the axial length of the grooves (14) and which is bounded by a second axial wall (16), and a projecting portion (25) of the hub portion (1) extending axially from this second axial wall (16) towards adjacent first axial flat wall (13).

* * * * *